United States Patent Office 3,471,497
Patented Oct. 7, 1969

3,471,497
1-ALKYL-5-OXO-5H-THIAZOLO[3,2-a]QUINAZO-LINE-2-CARBOXYLIC ACID ESTERS
Stanley C. Bell, Penn Valley, and Peter H. L. Wei, Upper Darby, Pa., assignors to American Home Products Corporation, New York, N.Y., a corporation of Delaware
No Drawing. Continuation-in-part of application Ser. No. 681,904, Nov. 9, 1967. This application Feb. 12, 1968, Ser. No. 704,519
Int. Cl. C07d 44/10
U.S. Cl. 260—251          5 Claims

ABSTRACT OF THE DISCLOSURE

This invention is concerned with 1-alkyl-5-oxo-5H-thiazolo[3,2-a]quinazoline-2-carboxylic acid esters which are pharmacologically active as central nervous system depressants.

---

This is a continuation-in-part application of United States patent application, Ser. No. 681,904 now abandoned, which was filed Nov. 9, 1967, by Stanley C. Bell and Peter H. L. Wei having the same title as the subject application.

This invention relates to new and novel nitrogen and sulfur containing tricyclic compounds. In particular, this invention is concerned with 1-alkyl-5-oxo-5H-thiazolo[3,2-a]quinazoline-2-carboxylic acid esters which have central nervous system depressant properties when tested under standard and acceptable pharmacological procedures.

The new and novel compounds within the purview of the present invention are exemplified by the following formula:

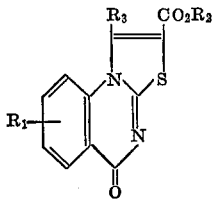

wherein $R_1$ is selected from the group consisting of hydrogen, halogen, lower alkyl and lower alkoxy; and $R_2$ and $R_3$ are lower alkyl. The terms "lower alkyl" and "lower alkoxy" as employed herein are meant to include both branched and straight chain moieties having from one to about eight carbon atoms. Typical examples of the compounds of this invention are: 7-chloro-1-methyl-5-oxo-5H-thiazolo[3,2-a]quinazoline-2-carboxylic acid ethyl ester; 1,8 - dimethyl-5-oxo-5H-thiazolo[3,2-a]quinazoline-2-carboxylic acid, ethyl ester and 7-methoxy-1-methyl-5-oxo-5H-thiazolo[3,2-a]quinazoline-2-carboxylic acid, ethyl ester.

The new and novel compounds of the present invention are prepared by the process which is hereinafter exemplified as follows:

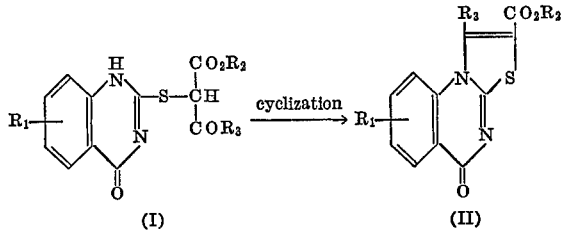

wherein $R_1$, $R_2$ and $R_3$ are defined as follows.

The cyclization reaction is effected by contacting an appropriate 2-(3,4-dihydro-4-oxo-2-quinazolinylthio)acyl-acetic acid ester (I) with a carboxylic acid anhydride, e.g. acetic anhydride at about reflux temperatures for a period of about one to about four hours.

When the cyclization reaction is complete, the resulting 1 - alkyl - 5 - oxo - 5H-thiazolo[3,2-a]quinazoline-2-carboxylic acid ester (II) is separated by routine procedures. For example, the reaction mixture is cooled, filtered and the collected solid recrystallized from a suitable solvent, e.g. dimethoxyethane. The 2-(3,4-dihydro-4-oxo-2-quinazolinylthio)acylacetic acid esters (I) employed as starting materials in the above process are described and prepared in copending and cofiled U.S. patent application, Ser. No. 681,884, entitled "2-(1,1-dioxo-2H-1,2,4-Benzothiadiazin-3-ylthio)Acylacetic Acid Esters and Related Compounds."

The new and novel 1-alkyl-5-oxo-5H-thiazolo[3,2-a]quinazoline-2-carboxylic acid esters of the present invention possess valuable pharmacological activity. In particular, these compounds in standard pharmacological procedures demonstrate nervous system activity and are useful as depressants. Because of this property they are of importance in experimental and comparative pharmacology.

In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compound of this invention in the above test procedure induce decreased motor activity at 12.7 mg./kg. There were no deaths in the test animals at the highest doses used, 400 mg./kg., intraperitoneally.

When the compounds of this invention are employed as central nervous system depressants they may be administered to warm-blooded animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

EXAMPLE I

2 - (6 - chloro-3,4-dihydro-4-oxo-2-quinazolinylthio) acetoacetic acid, ethyl ester (4.0 g., 0.0118 M.) is suspended in 50 ml. of acetic anhydride and heated to reflux for one hour. The hot solution is treated with charcoal and cooled. The precipitated solid (2.0 g.) is then recrystallized from dimethoxyethane to afford 7-chloro-1-methyl - 5 - oxo - 5H-thiazolo[3,2-a]quinazoline-2- carboxylic acid, ethyl ester, M.P. 166–168° C.

*Analysis.*—Calcd. for $C_{14}H_{11}ClN_2O_3S$: C, 52.08; H, 3.44; Cl, 10.98; N, 8.68; S, 9.93. Found: C, 52.30; H, 3.27; Cl, 11.03; N, 8.60; S, 10.29.

Similarly, 8 - fluoro - 1 - methyl - 5 - oxo-5H-thiazolo [3,2-a]quinazoline-2-carboxylic acid, methyl ester and 7-bromo-2-ethyl-5-oxo-5H-thiazolo[3,2 - a]quinazoline - 2-carboxylic acid, ethyl ester are prepared.

EXAMPLE II

2 - (3,4 - dihydro-7-methyl-4-oxo-2-quinazolinylthio) acetoacetic acid, ethyl ester (2.0 g.), is suspended in 25 ml. of acetic anhydride and heated to reflux for two hours. The hot solution is treated with charcoal, cooled and precipitated solid recrystallized from ether to afford 1,8-dimethyl - 5 - oxo - 5H - thiazolo[3,2-a]quinazoline-2-carboxylic acid, ethyl ester.

In like manner, 2-(3,4-dihydro-4-oxo-7-propyl-2-quinazolinylthio)butyroacetic acid, methyl ester and 2-(6-ethyl-3,4-dihydro-4-oxo-2-quinazolinylthio)acetoacetic acid, butyl ester are respectively converted to 1,8-dipropyl-5-oxo - 5H - thiazolo[3,2-a]quinazoline-2-carboxylic acid, methyl ester and 7-ethyl-1-methyl-5-oxo-5H-thiazolo [3,2-a]quinazoline-2-carboxylic acid, butyl ester.

EXAMPLE III

2 - (3,4 - dihydro-6-methoxy-4-oxo-2-quinazolinylthio) acetoacetic acid, ethyl ester (8.0 g.) is suspended in 100 ml. of acetic anhydride and heated to reflux for four hours. The hot solution is cooled and the precipitated solid is then recrystallized from dimethoxyethane to afford 7 - methoxy-1-methyl-5-oxo-5H-thiazolo[3,2-a]quinazoline-2-carboxylic acid, ethyl ester.

EXAMPLE IV

Repeating the procedure of Examples I–III to cyclize an appropriate 2-(3,4-dihydro-4-oxo-2-quinazolinylthio) acylacetic acid ester the following compounds are obtained:

7 - ethoxy - 1-ethyl-5-oxo-5H-thiazolo[3,2-a]quinazoline-2-carboxylic acid, butyl ester;

8 - propoxy - 1-propyl-5-oxo-5H-thiazolo[3,2-a]quinazoline-2-carboxylic acid, methyl ester; and 1 - methyl - 5-oxo-5H-thiazolo[3,2-a]quinazoline-2-carboxylic acid, ethyl ester.

What is claimed is:

1. A compound selected from the group consisting of those having the formula:

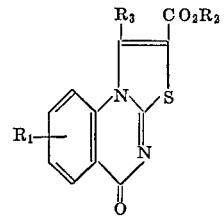

wherein $R_1$ is selected from the group consisting of hydrogen, halogen, lower alkyl and lower alkoxy; and $R_2$ and $R_3$ are lower alkyl.

2. A compound as described in claim 1 which is: 7-chloro - 1 - methyl-5-oxo-5H-thiazolo[3,2-a]quinazoline-2-carboxylic acid, ethyl ester.

3. A compound as described in claim 1 which is: 1,8-dimethyl - 5 - oxo - 5H - thiazolo[3,2 - a]quinazoline - 2-carboxylic acid, ethyl ester.

4. A compound as described in claim 1 which is: 7-methoxy - 1-methyl-5-oxo-5H-thiazolo[3,2-a]quinazoline-2-carboxylic acid, ethyl ester.

5. A compound as described in claim 1 which is: 1-methyl - 5 - oxo - 5H - thiazolo[3,2-a]quinazoline-2-carboxylic acid, ethyl ester.

References Cited

Sharma et al.: C. A. 51, 8106a (1957).

ALEX MAZEL, Primary Examiner

R. V. RUSH, Assistant Examiner

U.S. Cl. X.R.

424—251